UNITED STATES PATENT OFFICE.

FRANCIS HENRY FROEDMAN, OF DUBLIN, COUNTY OF DUBLIN, IRELAND.

METHOD OF MANUFACTURING SUPPORTS FOR PHOTOGRAPHIC EMULSION.

SPECIFICATION forming part of Letters Patent No. 386,006, dated July 10, 1888.

Application filed March 17, 1887. Serial No. 231,316. (No specimens.) Patented in England August 20, 1886, No. 10,659.

*To all whom it may concern:*

Be it known that I, FRANCIS HENRY FROEDMAN, of 23 Mary street, Dublin, Ireland, a citizen of the United Kingdom of Great Britain and Ireland, have invented a certain new and useful Manufacture of a Transparent Flexible Material suitable for all purposes where a transparent, flexible, and light material is required, such as a base for photographic pictures, transparent show-cards, artistic work, and other similar purposes; and I do hereby declare that the following is a clear and exact description of the invention, which will enable others skilled in the art to which it appertains to make and use the same.

This invention relates to an improved base for photographic emulsions or sensitive films; and it has for its objects to provide a base that will be flexible, insoluble in water, transparent, and perfectly permeable to actinic light, as more fully hereinafter specified.

To this end my invention consists in a base composed of gelatine combined with a suitable chromium salt and rendered insoluble in water by exposure to light, and finally bleached by means of sulphurous acid or the salts of such acid, as more fully hereinafter set forth.

My invention is particularly designed to produce a base or sheet for photographic negatives, which must necessarily be transparent or permeable to actinic light to permit the negative to be printed therefrom. For this reason the final operation of decolorizing or bleaching the base is absolutely necessary, as the color of the sheet after exposure would otherwise be almost impervious to actinic light and utterly worthless for the purpose intended.

In carrying out my invention I employ any of the chromium salts, but preferably the bichromate of potash and any suitable variety of gelatine, the proportions varying according to circumstances.

For general purposes I employ the following ingredients in the proportions named: gelatine, three parts; water, twenty-four parts; bichromate of potash, six and one-half parts; alcohol, four parts; glycerine, *q. s.*

The gelatine is softened by soaking in a portion of the water. It is then heated in a water bath and more of the water is added. The bichromate in solution in the remaining water is then added, and finally the alcohol and glycerine, and the whole is stirred until a homogeneous emulsion is obtained. The emulsion thus prepared may be formed into sheets in any convenient manner. In practice, however, I generally prepare the sheet by spreading the same on an absolutely clean flat surface suitably prepared for its reception and afterward drying it and removing it from such surface.

I preferably employ perfectly flat glass upon which to prepare the sheets, and proceed as follows: The glass is first cleaned in any convenient manner and its surface coated with collodion, which is allowed to "set," when the plate is immersed in water until all appearance of greasiness is removed, or the surface of the plate may be coated at its edges with a film of rubber dissolved in benzole, which is allowed to dry. The bichromated gelatine solution is then spread upon the prepared plate in any convenient manner and allowed to dry. It is then exposed to light until it becomes insoluble, after which it is thoroughly washed to remove any undecomposed chrome-salt. It is then immersed in a solution of sulphurous acid, or one of its compounds, and allowed to remain until thoroughly bleached, after which it is removed and washed until all acidity disappears. It is then dried and the film finally stripped from the glass, when it is ready for use. The sensitive emulsion is then applied in the manner employed by those skilled in the art of making sensitized photographic plates.

The sensitized sheet may be employed as usual in the ordinary camera dark slide or plate holder, or it may be prepared in suitable lengths and employed in roller-holders, as will be readily understood by photographers.

Having thus described my invention, what I claim, and desire to secure by Letters Patent, is—

The process herein described of preparing a base for photographic negatives, the same consisting in forming a sheet of insoluble bichromated gelatine and decolorizing said sheet by means of sulphurous acid, so as to transmit actinic light for the purpose of printing, substantially as specified.

Dated this 4th day of March, 1887.

FRANCIS HENRY FROEDMAN.

Witnesses:
ANGELO FAHIE, C. E.,
10 *Leinster Street, Dublin.*
J. L. McCASKILL.